United States Patent [19]
Hegner et al.

[11] Patent Number: 5,750,899
[45] Date of Patent: May 12, 1998

[54] CAPACITIVE PRESSURE SENSOR WITH SENSING ELEMENT MECHANICALLY ISOLATED FROM THE CASING

[75] Inventors: Frank Hegner, Lörrach; Elke Maria Schmidt, Schopheim; Ulfert Drewes, Heitersheim; Rainer Martin, Efringen-Kirchen, all of Germany

[73] Assignee: ENVEC Mess- und Regeltechnik GmbH + Co., Weil am Rhein, Germany

[21] Appl. No.: 929,030

[22] Filed: Sep. 15, 1997

Related U.S. Application Data

[63] Continuation of Ser. No. 696,483, Aug. 14, 1996, abandoned.

[30] Foreign Application Priority Data

Aug. 19, 1995 [EP] European Pat. Off. ............... 95113064
Jun. 14, 1996 [EP] European Pat. Off. ............... 96810394

[51] Int. Cl.⁶ ............................. G01L 7/00; G01L 7/08
[52] U.S. Cl. ................................... 73/756; 73/706
[58] Field of Search ........................... 73/706, 715, 716, 73/720, 721, 726, 727, 756

[56] References Cited

U.S. PATENT DOCUMENTS

| | | | |
|---|---|---|---|
| 4,898,035 | 2/1990 | Yajima et al. | 73/727 |
| 5,212,989 | 5/1993 | Kodama et al. | 73/706 |
| 5,317,921 | 6/1994 | Kremidas | 73/721 |
| 5,392,653 | 2/1995 | Zanger et al. | 73/756 |
| 5,665,921 | 9/1997 | Gerst et al. | |

FOREIGN PATENT DOCUMENTS

| | | |
|---|---|---|
| 0 167 144 | 1/1986 | European Pat. Off. |
| 2 015 962 | 11/1971 | Germany. |
| 41 18 824 A1 | 12/1991 | Germany. |
| 42 34 290 A1 | 4/1994 | Germany. |
| 5332860 | 12/1993 | Japan. |
| 2 012 052 | 7/1979 | United Kingdom. |

*Primary Examiner*—William L. Oen
*Attorney, Agent, or Firm*—Bose McKinney & Evans

[57] ABSTRACT

To provide a flush-mounted and corrosion-resistant pressure sensor for measuring the pressure of a medium which, on the one hand, is very rugged and, on the other hand, has a casing (2) mechanically isolated from the sensing element (1) as perfectly as possible, and whose measured values exhibit little temperature dependence and little hysteresis, the casing (2) has an internal space (21) and is preferably pot-shaped for receiving the sensing element (1). An annular, particularly annular-disk-shaped, flexible connecting element (3), disposed between the casing (2) and the sensing element (1), and the sensing element close the interior space (21) toward the medium to be measured, and a liquid (4) fills the enclosed interior space (21).

11 Claims, 2 Drawing Sheets

5,750,899

CAPACITIVE PRESSURE SENSOR WITH SENSING ELEMENT MECHANICALLY ISOLATED FROM THE CASING

This is a continuation of application Ser. No. 08/696,483, filed Aug. 14, 1996 now abandoned.

FIELD OF THE INVENTION

The present invention relates to a pressure sensor. Pressure sensors are used in many branches of industry. Depending on its use, a pressure sensor must meet a great number of requirements. In general, pressure sensors which offer high accuracy and are of rugged construction are preferred.

BACKGROUND OF THE INVENTION

U.S. Pat. No. 5,212,989 discloses a pressure sensor comprising
  a sensing element,
  a casing having a central axial bore extending therethrough for receiving the sensing element,
  a corrugated diaphragm closing a first end of the bore and thus sealing the casing,
  a support plate disposed within the casing and closing a second end of the bore,
  an interior space enclosed by the support plate, the casing, and the diaphragm,
    the sensing element being disposed in the interior on the support plate, and
    a liquid filling the enclosed interior space.

This assembly thus comprises a liquid-filled pressure transducer wherein a pressure acting on the diaphragm is transmitted through the liquid to the sensing element, which is remote from the diaphragm.

A disadvantage of such a pressure sensor is that a temperature-induced change in the volume of the liquid causes errors of readings. Such errors are considerable, particularly at low pressures to be measured, e.g., pressures from 0 Pa to 50 kPa, so that sufficient accuracy, e.g., accuracy within less than one percent, cannot be ensured or can only be ensured with very complicated error corrections.

Furthermore, the diaphragm is generally very thin and, therefore, sensitive. Since one side of the diaphragm is acted upon by the medium whose pressure is to be measured, and since such media are frequently abrasive, plastic deformations of the diaphragm and, thus, measuring errors may easily result. If the diaphragm is destroyed, the liquid will leak out. Use of a more rugged diaphragm is generally impossible, because this would result in a limitation of the measuring range of the pressure sensor.

Due to the sensitivity of the diaphragm of such pressure sensors, it is generally necessary to protect the diaphragm against excessive deflection, i.e., to provide overload protection, e.g., a diaphragm bed adapted to the shape of the diaphragm to limit the deflection of the latter.

DE-A-42 34 290 discloses a pressure sensor comprising
  a ceramic sensing element,
  a rotationally symmetric casing having an axial through hole
    whose diameter decreases toward a front side facing a medium to be measured, and
  a single sealing element flush-fitted between the casing and a lateral surface of the pressure sensor for holding the sensing element in the casing flush with the front surface of the casing. GB-A-2 012 052, particularly FIG. 5, discloses a transducer of similar design for measuring the pressure of a medium, comprising
  a piezoelectric sensing element formed by a tourmaline crystal,
  a rotationally symmetric container having a central axial through hole for receiving the sensing element,
  a thin metal foil as a diaphragm closing a first end of the hole and thus sealing the container,
    the sensing element being bonded to the inside surface of the metal foil, maintaining a lateral, ring-shaped distance from the container,
    a plate disposed within the container and closing the the hole,
    an interior space enclosed by the plate, the container, and the diaphragm, and
    a liquid filling the enclosed interior space.

A disadvantage of each of the pressure sensors described in the two latter publications is that the sensing element is fixedly mounted in the case or container. Thus, any pressure exerted on the sensing element or the diaphragm will cause high forces at the fixing point, which may produce strain between the sensing element and the case or container and result in deflection and/or bending of the sensing element. This deteriorates the hysteresis and the thermal characteristic of the measured value of the overall system.

SUMMARY OF THE INVENTION

Accordingly, it is an object of the invention to provide a flush-mounted and corrosion-resistant pressure sensor which, on the one hand, is extremely rugged and in which, on the other hand, the casing is mechanically isolated from the sensing element as perfectly as possible, and whose measured values exhibit little temperature dependence and little hysteresis.

To attain this object, the invention provides a pressure sensor for measuring the pressure of a medium, comprising:
  a sensing element;
  a casing, particularly a pot-type casing, for receiving the sensing element and having an interior space;
  an annular, particularly annular-disk-shaped, flexible connecting element connecting the casing with an edge of the sensing element,
    the flexible connecting element and the sensing element closing the interior space toward the medium to be measured; and
    a liquid filling the enclosed interior space.

In one embodiment of the invention, the flexible connecting element is made of metal. In another embodiment of the invention, the flexible connecting element is secured and hermetically sealed to the sensing element, particularly by diffusion welding or active brazing, and to the casing, particularly by welding. In these embodiments of the invention, the connecting element is preferably a corrugated diaphragm.

In a further embodiment of the invention, the sensing element, in addition to being fixed in the casing by the connecting element, is secured against tilting with respect to the casing.

In another embodiment of the invention, the connecting element is a seal, particularly an O ring.

In a further embodiment, the flexible connecting element and the sensing element close the casing flush with the front surface of the latter.

In a further embodiment, an incompressible and shear-force-free liquid or an oil, particularly a silicone oil, or a gel, particularly a silicone gel, is used.

In a preferred embodiment of the invention, the sensing element is a pressure-measuring cell of ceramic, particularly alumina ceramic. The pressure-measuring cell may comprise a sensor diaphragm and a substrate which have comparable physical properties, particularly comparable stiffness and/or comparable thickness.

One advantage of the invention is that the sensing element, with the exception of the area exposed to the medium to be measured, is surrounded by the liquid. In the latter, their exists an isostatic back pressure corresponding to a pressure acting on the pressure sensor, by which the sensing element is held in position. As a result, the pressure sensor is very robust, and no overload protection is necessary even under extreme pressure loads, e.g., at a pressure of $10^8$ Pa (=1000 bars).

The measured values of pressure sensors according to the invention show little hysteresis, since the joints between the connecting element and the sensing element and between the connecting element and the casing are not loaded by the pressure acting on the pressure sensor.

Furthermore, the measured values of pressure sensors according to the invention exhibit little temperature dependence, since the temperature-induced load changes in the liquid have no effect on the sensing element, and since temperature-induced load changes in the connecting element are absorbed by the latter.

Furthermore, the sensing element is not subjected to any nonuniform loads, since the same pressure acts on it from all sides. A further advantage is that the pressure sensor is simple in construction and has a small number of components.

BRIEF DESCRIPTION OF THE DRAWINGS

The invention and further advantages will become more apparent from the following description of embodiments of the invention taken in conjunction with the accompanying drawings, in which like parts are designated by like reference characters. In the drawings.

DETAILED DESCRIPTION OF THE DRAWINGS

Figure 1:
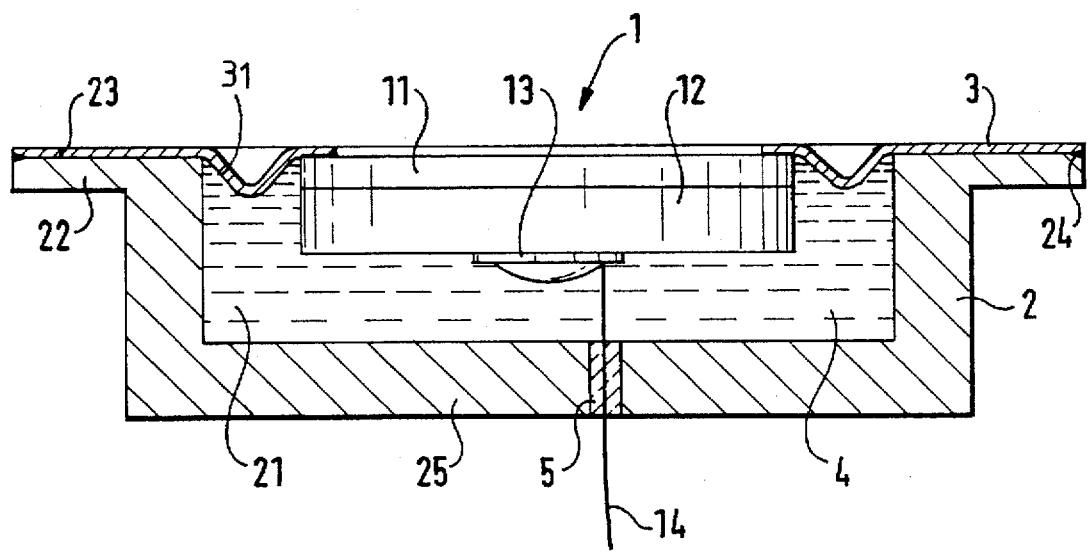
FIG. 1 is a schematic longitudinal section through a first embodiment of a pressure sensor in accordance with the present invention.
Figure 2:
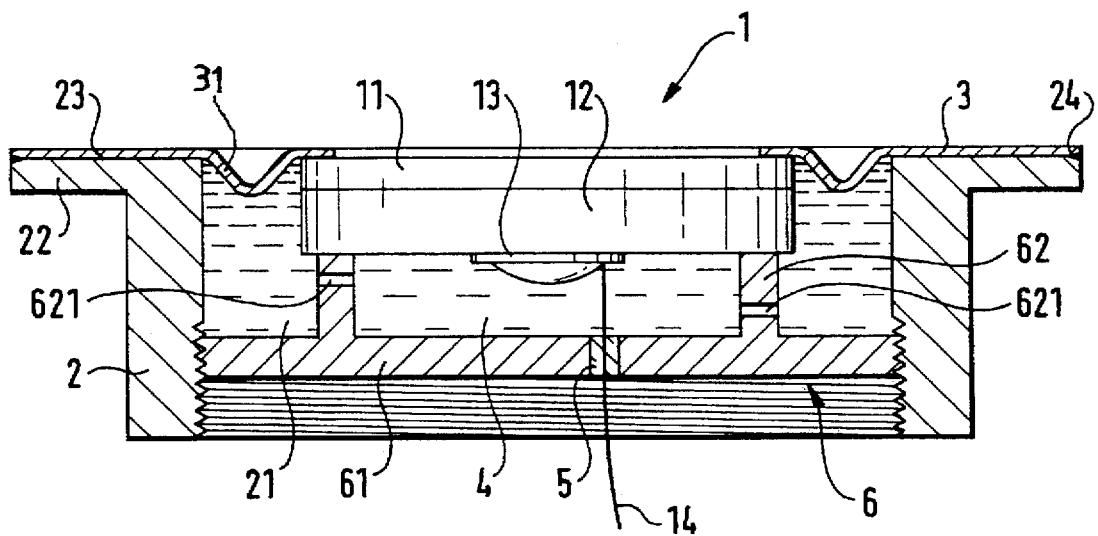
FIG. 2 is a schematic longitudinal section through a development of the pressure sensor of FIG. 1.
Figure 3:
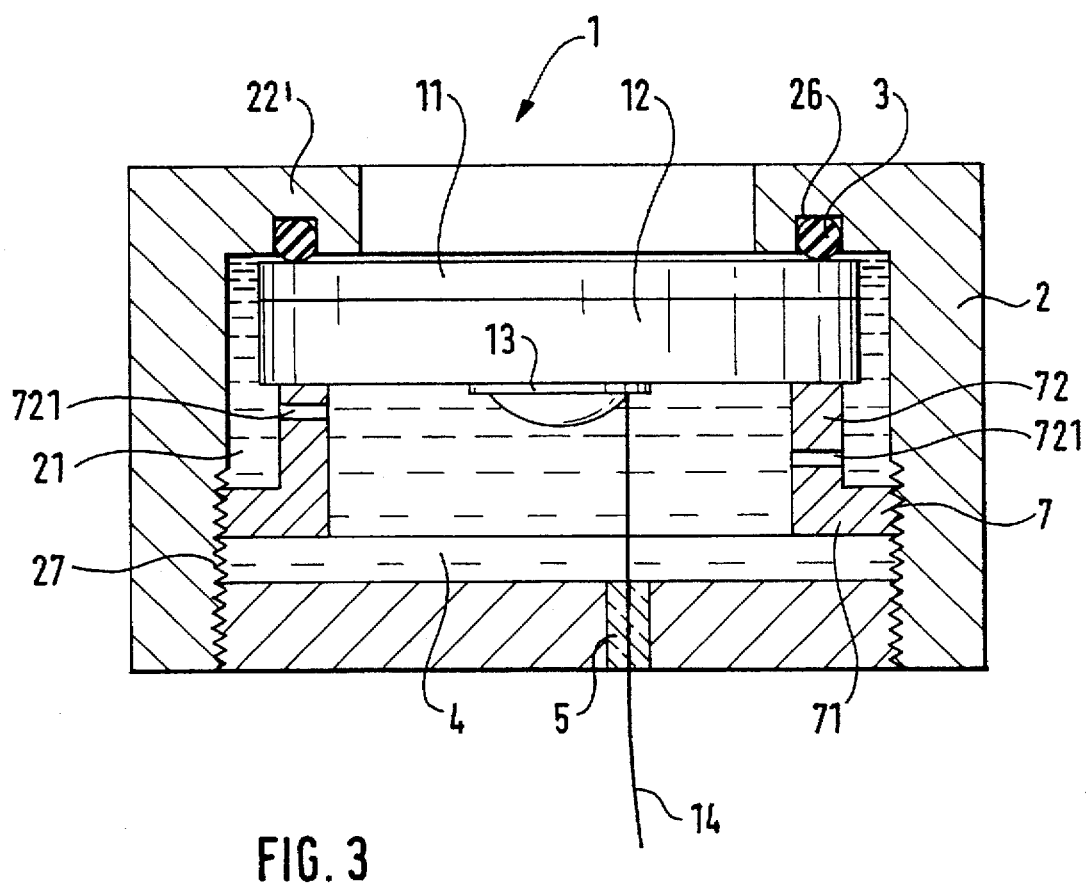
FIG. 3 is a schematic longitudinal section through a second embodiment of the pressure sensor in accordance with the present invention.

In FIGS. 1 to 3, a sensing element 1 is shown as the main part of the pressure sensor illustrated in respective schematic longitudinal sections. The sensing element is, for example, a ceramic capacitive, cylindrical pressure-measuring cell comprising a sensor diaphragm 11 and a substrate 12. These two parts are held at a defined distance from each other and joined tightly by means of a joining material, such as an active brazing alloy, forming an inner chamber.

As the respective inner surfaces of the sensor diaphragm 11 and the substrate 12 are coated with an electrode material, they form at least one measuring capacitor whose capacitance depends on the deflection of the diaphragm 11, so that it is a measure of the pressure acting on the diaphragm.

The sensor diaphragm 11 may be made of ceramic, oxide ceramic, particularly alumina, quartz, sapphire, or a crystalline material. The substrate 12 is preferably made of a material which is very similar to the material of the sensor diaphragm 11 or at least has a comparable coefficient of thermal expansion.

On the side of the substrate 12 remote from the chamber, the sensing element 1 has an electronic circuit 13 which converts changes in the capacitance of the above-mentioned at least one measuring capacitor into a pressure-dependent voltage and/or into a pressure-dependent electric current, and which makes this voltage/current available for further processing and/or display via connecting leads 14. The circuit 13 may also be located outside the casing 2 and be connected to the sensing element 1 via leads.

The sensing element 1 is disposed in an interior space 21 of a casing 2, in the embodiment of FIG. 1 a rotationally symmetric, pot-type casing. The casing is made of high-grade steel, for example, and has at its open end a radially outwardly extending shoulder, which forms a flange 22.

A flexible connecting element 3 is permanently joined to an annular outer surface 23 of the flange 22. In the embodiment of FIG. 1, the flexible connecting element 3 is a corrugated diaphragm 31 which has the shape of an annular disk. It is made of a metal which is resistant to the medium to be measured and which has a temperature coefficient comparable to that of the material of the sensing element 1. The material of the connecting element 3 is a high-grade steel or another high-quality metal, such as nickel, nickel-iron, niobium, or tantalum, depending on the medium to be measured.

Preferably, use is made of a thick and, thus, very rugged diaphragm. This does not affect the measurement accuracy in any way, since the pressure to be measured is not transmitted to the sensing element 1 via the corrugated diaphragm 31, unlike in the above-mentioned GB-A-2 012 052, where the pressure is transmitted via the thin metal foil.

The corrugated diaphragm 31, representing the connecting element 3, is secured and hermetically sealed, e.g., welded, to the flange 22 of the casing 2. This joint 24 is shown only schematically in FIG. 1.

The sensing element 1 is so disposed in the casing 2 that the outer surface of the sensor diaphragm 11 and the annular outer surface 23 of the flange 22 lie in the same plane. The axes of symmetry of casing 2 and sensor element 1 are identical, so that the latter is centered in the casing.

An inner annular surface of the connecting element 3 is connected with an outer annular edge surface of the outside of the diaphragm 11, e.g., by a hermetic, i.e., gas-tight and diffusion-tight, joint. Examples of such a hermetic joint between a sensor diaphragm, particularly of ceramic, and a connecting element 3, particularly of metal, are a diffusion-welded joint or an active-brazed joint.

Active brazing materials are alloys which contain at least one reactive element, such as titanium or zirconium. The reactive element reduces, and therefore wets, the surfaces of the parts to be brazed. In the case of oxide ceramics, the high affinity of the reactive element to oxygen causes a reaction with the ceramic, which results in the formation of mixed oxides and free valance electrons. A zirconium-nickel-titanium brazing alloy which is preferred in the case of alumina ceramics is described in U.S. Pat. No. 5,334,344.

The sensing element 1 and the connecting element 3 close the casing 2 flush with the front surface of the latter. This is particularly desired in the food industry, because flush-mounted pressure sensors are very easy to clean. The concrete design of the connecting element 3 is arbitrary provided it is ensured that expansion of the connecting element is possible both parallel and perpendicular to the axis of symmetry of casing 2 and sensing element 1.

The corrosion resistance of the sensor diaphragm 11 can be fully utilized if the joint between the connecting element 2 and the sensor diaphragm 11 is equally corrosion-resistant. The same applies analogously to the joint 24 between the connecting element 3 and the flange 22 of the casing 2, if this joint is exposed to the medium to be measured at all. If the joint 24 is covered from the medium to be measured, e.g., by the means for mounting the pressure sensor on a vessel, it need not be corrosion-resistant.

The part of the enclosed interior 21 of the casing 2 not occupied by the sensing element 1 is filled with a liquid 4. This liquid is preferably incompressible and preferably free from shear forces. Then, an isotropic pressure distribution will exist in the liquid 4 even in case of rapid changes in the pressure acting on the pressure sensor, so that no resulting direction-dependent forces will act on the sensing element 1. As the leads 14 run through the interior space, a nonconductive liquid 4 must be used.

The requirements just mentioned are fulfilled, for example, by an oil, particularly a silicone oil, or a gel, particularly a silicone gel. For applications where it is to be ensured that no liquid will leak out in case of the pressure sensor being destroyed, a gel will preferably be used. Otherwise an oil will preferably be used.

If an oil is used and the pressure sensor should be destroyed, the liquid 4 will leak out, and the medium to be measured will penetrate into the pressure sensor. A resulting change in electric conductivity can be used, for example, to trigger an alarm.

The substrate 12 and a cylindrical surface of the sensing element 1 are surrounded by the liquid 4. A pressure acting on the sensor diaphragm 11 and the connecting element 3 causes an isostatic pressure in the liquid 4 which counteracts the pressure acting on the sensor diaphragm and the connecting element. Thus, the sensing element 1 is held in position without the joints between the connecting element 3 and the flange 22 of the casing 2 and between the connecting element 3 and the sensor diaphragm 11 being subjected to any pressure load.

The liquid 4 also provides overload protection. The pressure acting on the pressure sensor is transmitted by the liquid 4 to the casing 2. By contrast, the same pressure acts on the sensing element 1 on all sides. The sensing element 1 is not subjected to any punctual or linear load, for example, that could result in its destruction.

High bursting strength is provided, since the casing 2 is very sturdy and since, if the sensing element 1 or the connecting element 3 should be destroyed, the medium to be measured will not penetrate through the casing 2 into a space which, viewed from the medium to be measured, lies behind the pressure sensor. Such a space is, for example, the interior space of an electronics housing in which the pressure sensor is installed. The pressure sensor can therefore be used for measuring very high pressures, e.g., pressures up to $10^8$ Pa (=1000 bars).

Instead of a sensing element 1 with a stiff substrate 12 which is very sturdy in comparison with the sensor diaphragm 11, a sensing element 1 with a substrate 12 having physical properties comparable to those of the sensor diaphragm 11, particularly having the same thickness or the same stiffness, can be used. In that case, sensor diaphragm 11 and substrate 12 will deflect by the same amount when a pressure acts on the pressure sensor. The sensitivity of such a pressure sensor is twice that of a pressure sensor with a rugged, stiff substrate 12, without the mechanical stability of the pressure sensor being reduced. With fixedly mounted sensing elements this is not possible, since the mounting and, thus, the substrate are exposed to the total applied pressure.

Any thermal expansion of the liquid 4 has no effect on the accuracy of the pressure sensor. As the liquid is preferably isotropic and free from shear forces, thermal expansion will only cause a shift of the sensing element 1 and a shift/or a deformation of the flexible connecting element 3. The measured pressure values therefore exhibit little temperature dependence, since the joints between the connecting element and the sensing element and between the connecting element and the casing are not loaded by the temperature acting on the pressure sensor.

Furthermore, the values measured by the pressure sensor show no pressure-dependent hysteresis as is caused by the mounting of the sensing element 1 in the casing 2. As the liquid 4 is preferably incompressible and free from shear forces, a constant isotropic pressure exists in the liquid at a given pressure value, regardless of the previous pressure values.

The casing 2 has a bottom wall 25 which contains a bushing 5, e.g., a glass bushing, through which the leads 14 of the sensing element 1 are brought out.

At the bottom wall 25, as already briefly mentioned above, a further electronics casing (not shown) may be provided for receiving further electronic circuits, evaluating units, and/or displays.

The mounting of the casing 2 at the measuring point is not illustrated in the figures. The casing 2 can be mounted by screwing the flange 22 to a mating flange. Alternatively, the casing 2 may have an external screw thread to be screwed into a corresponding internal screw thread, or it may be so designed that it can be welded into, e.g., an aperture of a vessel at the measuring point. Further nonpermanent or permanent mountings familiar to those skilled in the art are possible.

FIG. 2 shows a longitudinal section of a further embodiment of a pressure sensor. Unlike the pressure sensor illustrated in FIG. 1, this pressure sensor has an additional element 6 for fixing the sensing element 1. This element 6 is a disk 61 which replaces the bottom wall 25 of the casing 2 of FIG. 1 and is, for example, screwed or welded to the casing 2.

A hollow cylinder 62 is formed on the side of the disk 61 facing the interior space. The sensing element 1 rests on an annular surface of the hollow cylinder 62 remote from the disk via an edge portion of that circular area of the substrate 12 which is remote from the diaphragm. In addition to being fixed in position by the connecting element 3, the sensing element 1 is secured by the element 6 against tilting with respect to the casing 2.

The hollow cylinder 62 has bores 621 through which the two subspaces of the interior space 21 separated by the element 6 are connected, so that the liquid 4 can pass into these subspaces.

FIG. 3 shows a longitudinal section of a further embodiment of a pressure sensor in which the flexible connecting element 3 is a seal, preferably an O ring or a shaped seal made of an elastomer. The casing 2 has a radially inwardly extending shoulder 22'. On the side of the shoulder 22' facing the interior space, a groove 26 is provided for receiving the flexible connecting element 3.

The sensing element 1 is so held in the casing 2 by a support 7 that an outer ring surface of the sensor diaphragm 11 rests tightly against the connecting element 3. In the embodiment of FIG. 3, the support 7 is a threaded ring 71 having a hollow cylinder 72 formed thereon which is coaxial with the casing 2.

The threaded ring 71 is screwed into an internal screw thread 27 formed in the casing 2. The sensing element 1 rests on an annular surface of the hollow cylinder 72 remote from the threaded ring via an edge portion of that circular area of the substrate 12 which is remote from the diaphragm. Through the support 7, the sensing element 1 is fixed between the flexible element 3 and the hollow cylinder 72.

The hollow cylinder 72 has holes 721 through which the two subspaces of the interior space 21 of the casing 2 separated by the support 7 are connected, so that here, too, the liquid 4 can pass into these subspaces.

We claim:

1. A capacitive pressure sensor for measuring the pressure of a medium to be measured, comprising:
   a sensing element including a sensor diaphragm having an area exposed to a medium to be measured;
   a casing for receiving the sensing element and having an interior space;
   an annular flexible connecting element connecting the casing with an edge of the sensing element, the connecting element and the sensing element closing the interior space toward the medium to be measured; and
   a liquid filling the enclosed interior space and surrounding the sensing element except for the area of the sensor diaphragm exposed to the medium to be measured.

2. A pressure sensor as claimed in claim 1 wherein the flexible connecting element is made of a metal and is secured and hermetically sealed to the sensing element, particularly by diffusion welding or active brazing, and to the casing, particularly by welding.

3. A pressure sensor as claimed in claim 1 wherein the connecting element is a corrugated diaphragm.

4. A pressure sensor as claimed in claim 1 wherein the flexible connecting element is a seal, particularly an O ring.

5. A sensor as claimed in claim 1 wherein the sensing element, in addition to being fixed in the casing by the connecting element, is secured against tilting with respect to the casing.

6. A pressure sensor as claimed in claim 1 wherein the flexible connecting element and the sensing element close the casing flush with the front surface of the latter.

7. A pressure sensor as claimed in claim 1 wherein the liquid is incompressible and free from shear forces.

8. A pressure sensor as claimed in claim 1 wherein the liquid is an oil, particularly a silicone oil, or a gel, particularly a silicone gel.

9. A pressure sensor as claimed in claim 1 wherein the sensing element is a pressure-measuring cell of ceramic, particularly of alumina ceramic.

10. A pressure sensor as claimed in claim 9 wherein the pressure-measuring cell comprises a sensor diaphragm and a substrate which have comparable physical properties, particularly comparable stiffness and/or comparable thickness.

11. A pressure sensor as claimed in claim 1 wherein the connecting element is a corrugated diaphragm.

* * * * *